United States Patent [19]
Muffoletto et al.

[11] Patent Number: 5,716,422
[45] Date of Patent: Feb. 10, 1998

[54] THERMAL SPRAY DEPOSITED ELECTRODE COMPONENT AND METHOD OF MANUFACTURE

[75] Inventors: Barry C. Muffoletto, Alden; William M. Paulot, Lancaster; Joseph E. Spaulding, Tonawanda, all of N.Y.

[73] Assignee: Wilson Greatbatch Ltd., Clarence, N.Y.

[21] Appl. No.: 621,257

[22] Filed: Mar. 25, 1996

[51] Int. Cl.[6] .......................... H01M 6/00; H01M 4/58; C23C 4/10; C25B 7/00
[52] U.S. Cl. .......................... 29/623.5; 427/453; 429/218; 204/242
[58] Field of Search .......................... 204/242; 427/453; 429/218; 29/623.5

[56] References Cited

U.S. PATENT DOCUMENTS

| | | | |
|---|---|---|---|
| 2,714,563 | 10/1955 | Poorman et al. | 117/105 |
| 2,858,411 | 10/1958 | Gage | 219/75 |
| 2,950,867 | 5/1960 | Hawley et al. | 239/13 |
| 3,016,447 | 1/1962 | Gage et al. | 219/76 |
| 3,755,065 | 8/1973 | Chvatal | 161/192 |
| 3,892,882 | 7/1975 | Guest et al. | 427/34 |
| 3,914,573 | 10/1975 | Meuhlberger | 219/76 |
| 3,958,097 | 5/1976 | Fabel et al. | 219/76 |
| 3,981,746 | 9/1976 | Bezaudun et al. | 429/13 |
| 4,310,609 | 1/1982 | Liang et al. | 429/194 |
| 4,392,927 | 7/1983 | Fabian et al. | 427/453 X |
| 4,830,940 | 5/1989 | Keister et al. | 429/194 |
| 4,869,936 | 9/1989 | Moskowitz et al. | 427/423 |
| 4,965,151 | 10/1990 | Takada et al. | 429/191 |
| 5,080,056 | 1/1992 | Kramer et al. | 123/193 |
| 5,126,205 | 6/1992 | Chon et al. | 428/405 |
| 5,147,737 | 9/1992 | Post et al. | 429/94 |
| 5,194,342 | 3/1993 | Bito et al. | 429/191 |
| 5,198,308 | 3/1993 | Shetty et al. | 428/608 |
| 5,221,453 | 6/1993 | Crespi | 204/291 |
| 5,234,722 | 8/1993 | Ito et al. | 427/453 |
| 5,250,373 | 10/1993 | Muffoletto et al. | 429/161 |
| 5,254,415 | 10/1993 | Williams et al. | 429/218 |
| 5,268,045 | 12/1993 | Clare | 148/518 |
| 5,271,967 | 12/1993 | Krammer et al. | 427/455 |
| 5,272,802 | 12/1993 | Stites, III | 29/527 |
| 5,285,967 | 2/1994 | Weidman | 239/80 |
| 5,292,382 | 3/1994 | Longo | 148/320 |
| 5,312,653 | 5/1994 | Buchanan | 427/451 |
| 5,316,859 | 5/1994 | Harada et al. | 428/472 |
| 5,323,954 | 6/1994 | Shetty et al. | 228/187 |
| 5,324,407 | 6/1994 | Ernes et al. | 204/242 |
| 5,328,763 | 7/1994 | Terry | 428/559 |
| 5,397,657 | 3/1995 | Ito et al. | 427/453 X |
| 5,401,599 | 3/1995 | Tahara et al. | 204/242 X |
| 5,492,732 | 2/1996 | Paul et al. | 427/453 |
| 5,569,558 | 10/1996 | Takeuchi et al. | 429/218 X |
| 5,614,331 | 3/1997 | Takeuchi et al. | 429/164 X |
| 5,616,429 | 4/1997 | Klementowski | 429/219 X |

OTHER PUBLICATIONS

Chapter 1—Fundamentals of Plasma Chemistry by Alexis T. Bill (selected pages only) (No Date).
Chapter 2—Applications of Nonequilibrium Plasmas To Organic Chemistry by Harald Suhr (selected pages only) (No Date).
Thermal Spray Coatings by James H. Clare and Daryl E. Drawman (No Date).
Plasma and Detonation Gun Deposition Techniques and Coating Properties by Robert C. Tucker, Jr. (No Date).
Arc Surfacing and Cladding Process by W. Lucas No Date.
Unique Alloys Broaden Spectrum Of Arc—Spray Application by M.P. Zwetsloot (No Date).
Thermal Spraying; Processes, Preparation, Coatings and Applications by Charles P. Howers, Jr. (No Date).

*Primary Examiner*—Donald R. Valentine
*Attorney, Agent, or Firm*—Hodgson, Russ, Andrews, Woods & Goodyear LLP

[57] ABSTRACT

An electrode component for an electrochemical cell is described wherein the electrode is produced by thermal spraying an electrode active material onto a substrate to coat the substrate. Suitable thermal spraying processes include chemical combustion spraying and electrical heating spraying, using both wire and power processes.

69 Claims, 7 Drawing Sheets

SPRAY DEP.　　PULSE DISCHARGE　→ 190 mA

CATHODE PLATE # 1　　　SIDE 1

SPRAY DEP.　　PULSE DISCHARGE　→ 190 mA

CATHODE PLATE # 1　　　SIDE 2

SPRAY DEP.   PULSE DISCHARGE →   95mA

CATHODE PLATE # 2      SIDE 1

SPRAY DEP.   PULSE DISCHARGE →   95mA

CATHODE PLATE # 2      SIDE 2

SPRAY DEP. CONSTANT DISCHARGE → 604 Ω

CATHODE PLATE # 3     SIDE 1

SPRAY DEP. CONSTANT DISCHARGE → 604 Ω

CATHODE PLATE # 3     SIDE 2

SPRAY DEP. CONSTANT DISCHARGE → 604 Ω

CATHODE PLATE # 4    SIDE 1

SPRAY DEP. CONSTANT DISCHARGE → 604 Ω

CATHODE PLATE # 4    SIDE 2

THERMAL SPRAY DEPOSITED ELECTRODE COMPONENT AND METHOD OF MANUFACTURE

BACKGROUND OF THE INVENTION

1. Field of the Invention

The present invention generally relates to the art of electrochemical cells and more particularly, to an electrode for an electrochemical cell produced by thermal spraying an electrode active material onto a substrate to coat the substrate with the electrode active material.

Thermal spraying is defined as any coating process in which particles are heated to a molten or plastic state and propelled onto a substrate to form a coating. This includes chemical combustion spraying and electrical heating spraying, using both wire and powder processes. Thus, the present invention includes heating and projecting particles of an electrode active material onto a prepared electrode substrate using a thermal spraying process to thereby provide an electrode component for an electrochemical cell.

Thermal spray coatings of electrode active material usually exhibit two common features in the as-deposited condition, a sandpaper-like surface finish and a structure with inherent porosity. A typical surface roughness of an as-sprayed coating ranges from 5.0 µm to 13 µm or 200 µin to 500 µin arithmetic average (AA). The porosity usually ranges from 2 to 17 vol %, depending on the process by which the coating is deposited and the material sprayed. In that respect, thermal spray coating an electrode active material onto a substrate provides an electrode component for an electrochemical cell that can be thinner and/or more dense than those produced by conventional processes. This advantageously benefits electrode surface area which in turn benefits cell capacity and energy density and ultimately discharge efficiency.

2. Prior Art

Thermal spraying processes are currently used to recondition worn or used parts, to prepare machine parts and the like for extended wear in high friction and abrasion environments, and to prepare machine parts and the like for high temperature applications. Patents describing various thermal spraying processes for these applications include U.S. Pat. Nos. 2,714,563; 2,858,411; 2,950,867; 3,016,447; 3,892,882; 3,914,573; 3,958,097; 4,869,936; 5,080,056; 5,126,205; 5,198,308; 5,268,045; 5,271,967; 5,272,802; 5,285,967; 5,292,382; 5,312,653; 5,316,859; 5,323,954 and 5,328,763. Thermal spraying processes are also used extensively in the semi-conductor industry. However, as of yet, thermal spraying has not been used to deposit an electrode active material onto a substrate to provide an electrode component for an electrical cell.

SUMMARY OF THE INVENTION

The present invention is directed to depositing an electrochemically active material onto a suitable substrate to thereby form an electrode component for an electrochemical cell. Feedstock may be in the form of powder, wire, flexible powder-carrying tubes or rods depending on the particular thermal spraying process used. As the electrode active material passes through the spray gun, it is heated to a softened or molten state, accelerated and, in the case of wire or rod material, atomized. A confined stream of hot particles generated in this manner is propelled to the substrate and as the electrode active material particles strike the substrate surface, they flatten and form thin platelets which conform and adhere to the previously prepared electrode substrate. Either the gun or the substrate may be translated and the sprayed electrode active material builds up particle by particle into a lamellar structure which forms a coating on the electrode substrate.

The thusly produced electrode substrate is useful as an electrode, for example, a cathode electrode incorporated into a primary electrochemical cell, and as the anode and/or the cathode of a secondary electrochemical cell. The assembly of the cell incorporating the electrode components made by thermal spray coating an electrode active material onto a conductive substrate according to the present invention is preferably in the form of a wound element cell. That is, the fabricated cathode together with an anode and a separator are wound together in a "jellyroll" end type configuration or a "wound element cell stack" such that the anode is on the outside of the roll to make electrical contact with the cell case in a case-negative configuration. Other types of cells such as prismatic, bobbin shape and flat cells are also possible with the present invention.

BRIEF DESCRIPTION OF THE DRAWINGS

The above and other features and advantages of the present invention will be apparent in the following detailed description of the preferred embodiments taken in conjunction with the accompanying drawings, in which.

DETAILED DESCRIPTION OF THE INVENTION

Figure 1:
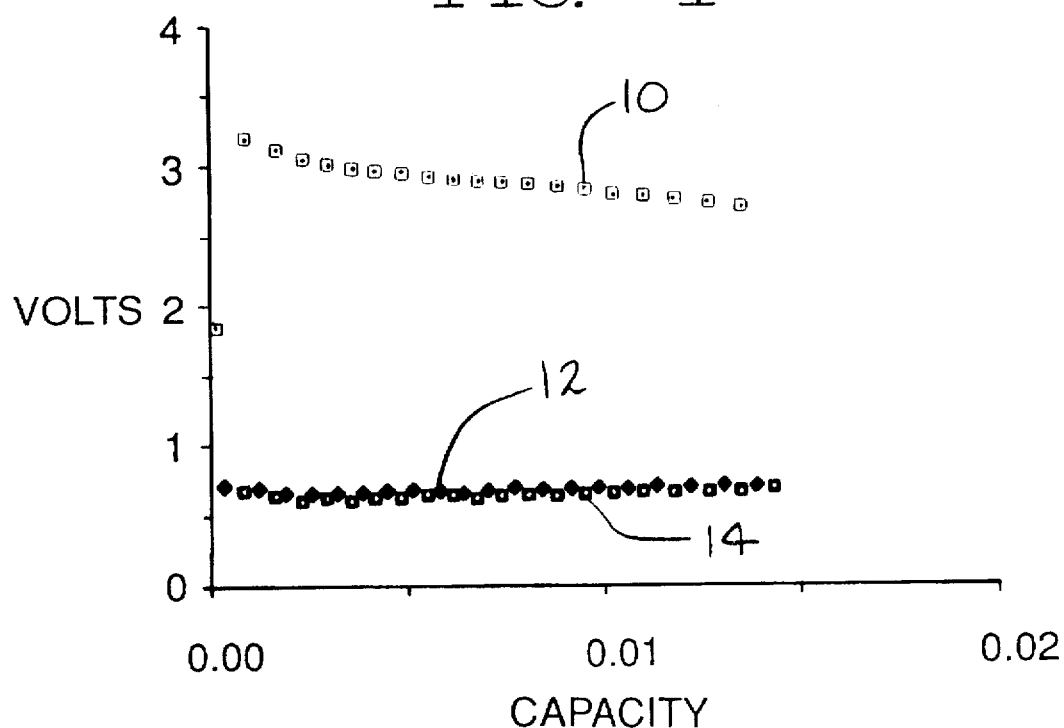
FIGS. 1 and 2 are graphs constructed from the pulse discharge curves of test cells incorporating a cathode formed having silver vanadium oxide (SVO) plasma spray deposited onto a current collector substrate according to the present invention.

Known thermal spraying processes may be classified into two groups namely, chemical combustion spraying processes and electric heating spraying processes. Chemical combustion spraying processes include powder flame spraying, wire/rod flame spraying, high velocity oxygen fuel flame spraying and detonation/explosive flame spraying. Electrical heating spraying processes include electric-arc or twin-wire arc spraying and plasma spraying. The two groups of spraying processes are generally delineated by the methods used to generate heat to plasticize and/or atomize the electrode active material. In general, flame sprayed coatings exhibit lower bond strengths, higher porosity, a narrower working temperature range and a higher heat transmittal to the substrate than electric-arc and plasma sprayed coatings.

Powder flame spraying involves the use of a powder flame spray gun consisting of a high-capacity, oxygen-fuel gas torch and a hopper containing the electrode active material in powder or particulate form. A small amount of oxygen from the gas supply is diverted to carry the powdered electrode active material by aspiration into the oxygen-fuel gas flame where the powder is heated and propelled by the exhaust flame onto the substrate workpiece. The fuel gas is usually acetylene or hydrogen and temperatures in the range of about 3,000° F. to 4,500° F. are typically obtained.

Particle velocities are on the order of about 80 to 100 feet per second. The coatings produced generally have low bond strength, high porosity and low overall cohesive strength.

Wire/rod flame spraying utilizes a wire of the electrode active material that is continuously fed into an oxy-acetylene flame where the wire is melted and atomized by an auxiliary stream of compressed air and then deposited as the coating of electrode active material on the substrate. This process also lends itself to use of plastic tubes filled with the electrode active material in a powder form.

High velocity, oxygen fuel flame spraying is a continuous combustion process that produces exit gas velocities estimated to be about 4,000 to 5,000 feet per second and particle speeds of about 1,800 to 2,600 feet per second. This is accomplished by burning a fuel gas (usually propylene) with oxygen under high pressure (60 to 90 psi) in an internal combustion chamber. Hot exhaust gases are discharged from the combustion chamber through exhaust ports and thereafter expanded in an extending nozzle. Electrode active powder is fed axially into the extending nozzle and confined by the exhaust gas stream until the electrode active material exits in a thin high speed jet to produce coatings which are more dense than those produced by powder flame spraying.

A modified flame spraying process is referred to as a flame spray and fuse process. In this process, the electrode component is prepared by coating an electrode active material onto the substrate using one of the above described flame spraying processes followed by a fusing step. Fusing is accomplished by one of several techniques such as flame or torch, induction, or in vacuum, inert or hydrogen furnaces. Typical fusing temperatures are between 1,850° F. to 2,150° F., and in that respect, the substrate material for the electrode needs to be able to withstand this temperature range.

In contrast to the previously described thermal spray processes, i.e., powder flame spraying, wire/rod flame spraying and high velocity, oxygen fuel flame spraying, which utilize the energy of a steady burning flame, the detonation/ explosive flame spraying process uses detonation waves from repeated explosions of oxy-acetylene gas mixtures to accelerate the powered electrode active material. Particulate velocities on the order of 2,400 feet per second are achieved and the electrode active material coating deposits are extremely strong, hard, dense and tightly bonded.

The electrical heating thermal spraying process, referred to as the twin-wire arc spraying process uses two consumable wires of electrode active material. The wires are initially insulated from each other and simultaneously advanced to meet at a focal point in an atomizing gas stream. Contact tips serve to precisely guide the wires and to provide good electrical contact between the moving wires and power cables. Heating is provided by means of a direct current potential difference applied across the wires to form an arc that melts the intersecting wires. A jet of gas (normally compressed air) shears off molten droplets of the melted electrode active material and propels this material onto the substrate. Sprayed electrode active material particle sizes can be changed with different atomizing heads and wire intersection angles. Direct current is supplied at potentials of about 18 to 40 volts, depending on the electrode active material to be sprayed; the size of particle spray increasing as the arc gap is lengthened with rise in voltage. Voltage is therefore maintained at a higher level consistent with arc stability to provide larger particles and a rough, porous coating that is suitable for intercalation of the ions produced by oxidation of the anode. Because high arc temperatures (in excess of about 7,240° F.) are typically encountered, twin-wire arc sprayed coatings have high bond and cohesive strength.

Plasma spraying involves the passage of a gas or a gas mixture through a direct current arc maintained in a chamber between a coaxially aligned cathode and water-cooled anode. The arc is initiated with a high frequency discharge that partially ionizes the gas to create a plasma having temperatures that may exceed 30,000° F. The plasma flux exits the gun through a hole in the anode which acts as a nozzle and the temperature of the expelled plasma effluent falls rapidly with distance. Powdered electrode active material feed-stock is introduced into the hot gaseous effluent at an appropriate point and propelled to the workpiece by the high velocity stream. The heat content, temperature and velocity of the plasma gas are controlled by regulating arc current, gas flow rate, the type and mixture ratio of gases and by the anode/cathode configuration.

Thermal spray coatings rely mostly upon mechanical bonding to the substrate surface. It is therefore critical that the electrode substrate be properly prepared to ensure coating quality. Substrate surface cleanliness is very important in all coating systems, especially for flame spray and fuse coatings. It is especially necessary that the surface remain uncontaminated by lubricants from handling equipment or body oils from the hands. Suitable substrate surface preparation techniques include scraping, wire brushing, machining, grit blasting, or by chemical action. It also is recommended that the prepared surface be coated as soon as possible after preparation to prevent the possibility of contamination or surface oxidation.

After substrate surface cleaning, surface roughness is the next most critical factor for properly applying a thermal spray coating of electrode active material. Three methods of roughening the electrode substrate surface are appropriate and they consist of rough threading, grit blasting, and a combination of rough threading, then grit blasting, as are well known to those skilled in the art of thermal spraying techniques.

While the above described thermal spraying processes are known for use in reconditioning worn or used parts, to prepare machine parts and the like for extended wear in high friction and abrasion environments, and to prepare machine parts and the like for high temperature applications, up to now, the inventors of the present invention are not aware of any use of these processes to produce electrodes suitable for electrical discharge in electrochemical cells. It is, therefore, contemplated by the scope of the present invention that any one of the previously described thermal spraying processes are useful for depositing an electrode active material onto an electrode substrate to thereby form an electrode component for an electrochemical cell. One preferred embodiment of the present invention comprises depositing by means of one of the previously described thermal spray coating processes, a cathode active material onto a substrate to form a cathode component for an electrochemical cell. The cathode active material can be selected from the group consisting of a metal, a metal oxide, a mixed metal oxide, a metal sulfide and a carbonaceous compound and mixtures thereof.

Another preferred embodiment of the present invention comprises depositing by means of one of the previously described thermal spray coating processes, an alkalated material onto a conductive substrate to provide a cathode for a secondary electrochemical cell. For example, in the case of the alkalated material being a lithiated material suitable materials include lithiated nickel oxide, lithiated cobalt oxides and lithiated mixed oxides of cobalt with nickel or tin. Among the suitable oxides are $LiNiO_2$, $LiCoO_2$, $LiCo_{0.92}Sn_{0.8}O_2$ and $LiCo_{1-x}Ni_xO_2$. The anode for such secondary electrochemical cell can comprise a particulate carbonaceous composition including carbon together with a filamentary, electrically conductive material such as carbon black. It is further contemplated by the scope of the present invention that particulate carbonaceous compositions are able to be thermal spray coated onto a conductive substrate for use as an anode component in a secondary cell and as the cathode in a primary electrochemical cell.

By way of illustration, and in no way intended to be limiting, an exemplary cathode active material comprises silver vanadium oxide having the general formula $Ag_xV_2O_y$ in any one of its many phases, i.e. β-phase silver vanadium oxide having in the general formula $x=0.35$ and $y=5.18$, γ-phase silver vanadium oxide having in the general formula $x=0.74$ and $y=5.37$ and ε-phase silver vanadium oxide having in the general formula $x=1.0$ and $y=5.5$, and combination and mixtures of phases thereof. Preferably, the cathode active material, whether comprised of silver vanadium oxide or a similarly suitable material, is deposited onto a titanium or an aluminum substrate by one of the thermal spraying coating processes. The thusly formed exemplary electrode can be incorporated into an alkali metal electrochemical cell, and more particularly, a lithium electrochemical cell.

One of the benefits of the present invention is that cathode plates made by any one of the thermal spray coating processes of the present invention are thinner than currently available positive electrodes. This provides for the manufacture of higher surface area cells housed in smaller containers than conventional electrode preparation technology permits. In that respect, the cathode active material can be coated on both sides of the substrate by one of the previously described spray coating processes to further increase the electrode active surface area. The substrate can also be perforated so that the coatings on both sides of the substrate are in physical contact with each other to lock the electrode active material onto the substrate.

The exemplary cell of the present invention having the cathode component made by thermal spray depositing a cathode active material onto a suitable substrate and preferably silver vanadium oxide deposited onto a titanium substrate, further comprises an anode selected from Group IA of the Periodic Table of Elements, including lithium, sodium, potassium, etc., and their alloys and intermetallic compounds including, for example Li-Si, Li-B and Li-Si-B alloys and intermetallic compounds. The preferred anode comprises lithium.

The form of the anode may vary, but preferably the anode is a thin metal sheet or foil of the anode metal, pressed or rolled on a metallic anode current collector, i.e., preferably comprising nickel to form an anode component. In the electrochemical cell of the present invention, the anode component has an extended tab or lead of the same material as the anode current collector, i.e., preferably nickel integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical reaction at the cathode component made by thermal spray depositing a cathode active material onto a suitable substrate involves conversion of ions which migrate from the anode to the cathode into atomic or molecular forms. The solid cathode material may comprise a metal element, a metal oxide, a mixed metal oxide, a metal sulfide or carbonaceous compounds and combinations thereof. Suitable cathode materials include silver vanadium oxide, copper silver vanadium oxide, manganese dioxide, titanium disulfide, copper oxide, cobalt oxide, chromium oxide, copper sulfide, iron sulfide, iron disulfide, carbon and fluorinated carbon. The solid cathode exhibits excellent thermal stability and is generally safer and less reactive than a non-solid cathode.

Preferably, the solid cathode material comprises a mixed metal oxide formed by thermal spray coating various metal oxides or metal oxide/elemental metal combinations. The materials thereby produced contain metals and oxides of Groups IB, IIB, IIIB, IVB, VB, VIB, VIIB and VIII of the Periodic Table of Elements, which includes the noble metals and/or their oxide compounds.

The exemplary cell of the present invention having the cathode component made by thermal spray depositing a cathode active material onto a suitable substrate includes a separator to provide physical separation between the anode and cathode active electrodes. The separator is of electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include non-woven glass, polypropylene, polyethylene, glass fiber material, ceramics, polytetrafluoroethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.). Other separator materials that are useful with the present invention include woven fabric separators comprising halogenated polymeric fibers, as described in U.S. Pat. No. 5,415,959 to Pyszczek et al., which is assigned to the assignee of the present invention and incorporated herein be reference. Examples of halogenated polymeric materials suitable for this application include, but are not limited to, polyethylene tetrafluoroethylene which is commercially available under the name Tefzel, a trademark of the DuPont Company; polyethylenechlorotrifluoroethylene which is commercially available under the name Halar, a trademark of the Allied Chemical Company and polyvinylidine fluoride.

The form of the separator typically is a sheet which is placed between the anode and cathode electrodes and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The exemplary electrochemical cell of the present invention having the cathode component made by thermal spray depositing a cathode active material onto a suitable substrate further includes a nonaqueous, ionically conductive electrolyte operatively associated with the anode and the cathode electrodes. The electrolyte serves as a medium for migration of ions between the anode and the cathode during the electrochemical reactions of the cell. The electrolyte is comprised of an inorganic salt dissolved in a nonaqueous solvent and more preferably an alkali metal salt dissolved in a mixture of low viscosity solvents including organic esters, ethers and dialkyl carbonates and high conductivity solvents including cyclic carbonates, cyclic esters and cyclic amides.

The nonaqueous solvents suitable for the present invention are chosen so as to exhibit those physical properties necessary for ionic transport (low viscosity, low surface tension, and wettability). Suitable nonaqueous solvents may be any one or more of the organic solvents which are substantially inert to the anode and cathode electrode materials, such as tetrahydrofuran, propylene carbonate, methyl acetate, diglyme, triglyme, tetraglyme, acetonitrile, dimethyl sulfoxide, dimethyl formamide, dimethyl acetamide, 1,2-dimethoxyethane and others. A preferred solvent comprises a 50/50 mixture (by volume) of propylene carbonate (PC) and dimethoxyethane (DME).

The preferred electrolyte of the present invention comprises an inorganic salt having the general formula $MM'F_6$ wherein M is an alkali metal similar to the alkali metal comprising the anode and M' is an element selected from the group consisting of phosphorous, arsenic and antimony. Examples of salts yielding $M'F_6$ are: hexafluorophosphate ($PF_6$), hexafluoroarsenate ($AS_6$) and hexafluoroantimonate ($SbF_6$). More preferably, the electrolyte comprises at least one ion-forming alkali metal salt of hexafluoroarsenate or hexafluorophosphate dissolved in a suitable organic solvent wherein the ion-forming alkali metal is similar to the alkali metal comprising the anode. Thus, in the case of an anode comprising lithium, the alkali metal salt of the electrolyte preferably comprises either lithium hexafluoroarsenate or lithium hexafluorophosphate dissolved in a 50/50 solvent mixture (by volume) of PC/DME. For a more detailed description of a nonaqueous electrolyte for use in the exemplary cell of the present invention, reference is made to U.S. patent application Ser. No. 08/342,432, which is assigned to the assignee of the present invention and incorporated herein by reference.

One preferred form of the cell assembly described herein is referred to as a wound element cell. That is, the fabricated cathode, anode and separator are wound together in a "jellyroll" end type configuration or "wound element cell stack" such that the anode is on the outside of the roll to make electrical contact with the cell case in a case negative configuration. Using suitable top and bottom insulators, the wound cell stack is inserted into a metallic case of a suitable size dimension. The metallic case may comprise materials such as stainless steel, mild steel, nickel-plated mild steel, titanium or aluminum, but not limited thereto, so long as the metallic material is compatible for use with components of the cell.

The cell header comprises a metallic disc-shaped body with a first hole to accommodate a glass-to-metal seal/terminal pin feedthrough and a hole for electrolyte filling. The glass used is of a corrosion resistant type having from between about 0% to about 50% by weight silicon such as CABAL 12, TA 23 or FUSITE 425 or FUSITE 435. The positive terminal pin feedthrough preferably comprises titanium although molybdenum and aluminum can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte described hereinabove and hermetically sealed such as by close-welding a stainless steel ball over the fill hole, but not limited thereto. This above assembly describes a case negative cell which is the preferred construction of the exemplary cell of the present invention. As is well known to those skilled in the art, the exemplary electrochemical system of the present invention can also be constructed in a case positive configuration.

The following examples describe the manner and process of making and using the hereinabove described thermal spraying processes to prepare electrode components that are useful in an electrochemical cell according to the present invention, and set forth the best mode contemplated by the inventors of carrying out the invention, but are not to be construed as limiting.

EXAMPLE I

Ten substrates were manufactured having a coating of silver vanadium oxide (SVO) spray deposited thereon using a plasma spray coating process. In particular, the electrode active material was plasma spray deposited in air using a Metco 3MB machine on a setting of 40 liters/minute of argon as the principle gas and 2.5 liters/minute (nominal) of hydrogen as the secondary gas. This as mixture was directed through a 50 volt/400 amp direct current arc. The spray distance was 3 inches using 4 liters/minute of carrier gas for the electrode active material having a nominal feed rate of 40 grams/minute. The substrate was 0.0045 inch thick titanium foil, cleaned and mirogrit blasted (particle size about 80 microns).

Four (4) of these substrates were dried overnight in a vacuumed oven at 140° C. and formed into the cathode electrode incorporated into test cells using the following steps:

1) The cathodes were weighted before leads were welded onto the current collectors, and the respective weights are listed in Table 1.

TABLE 1

| Cathode No. | Weight (g) |
|---|---|
| 1 | 0.487 |
| 2 | 0.486 |
| 3 | 0.487 |
| 4 | 0.477 |

2) Eight inch stainless steel leads were welded to the four cathode electrodes using a Unitek welder on a high power setting.

3) Four pieces of CELGARD 4560 separator material were cut into about six inch lengths, folded in half twice, then placed around each of the cathode electrodes.

4) Two pieces of lithium were cut to cover each of four sets of anode current collector screens. Each piece of lithium was brushed using a lithium brush to remove any oxide or nitride that may have developed on the surface.

5) The lithium pieces were centered on both sides of the cathode electrodes over the separator.

6) The anode screens were centered over the lithium on both sides for each cathode electrode.

7) One glass insulator was centered over the outside of the anode screens on both sides for each cathode electrode.

8) The cell assembly was secured together using large capacity binder clips with the handles removed.

9) The cells were placed into empty glass jars with the leads directed out the top.

10) Each cell was checked for short circuit conditions using a Beckman industrial megohmmeter and with no shorts found, an electrolyte comprising lithium hexafluoroarsenate in a 1:1 mixture, by volume, of propylene carbonate/dimethoxyethane was filled into the jar until the cathode electrode and anode electrode were immersed. The cell jar was then closed with a rubber cork and the rim was sealed with tape.

11) The voltage of each of the four test cells was checked using a Keithley 130 digital multimeter and the results are listed in Table 2.

TABLE 2

| Test Cell No. (Cathode No.) | Voltage (V) |
| --- | --- |
| 1 | 3.50 |
| 2 | 3.48 |
| 3 | 3.48 |
| 4 | 3.46 |

12) The test cells were then placed on discharge testing. Cells indicated as Nos. 1 and 2 were subjected to two pulse trains separated by thirty minutes rest. Specifically, Cell No. 1 was subjected to two constant current pulses of 190 mAmps and Cell No. 2 was subjected to two constant current pulses of 95 mAmps; each pulse lasting ten second with each ten second pulse separated by fifteen seconds of rest.

Figure 2:
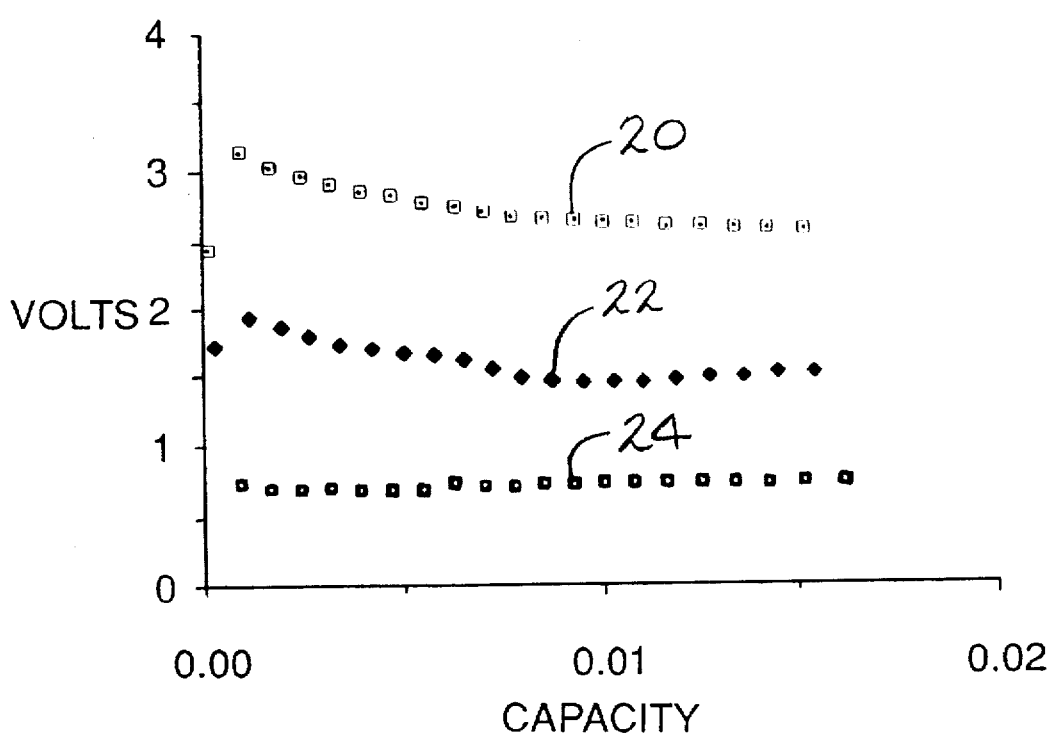

FIGS. 1 and 2 are graphs showing the pulse discharge curves of Test Cell No. 1 and 2, respectively. Particularly, curve 10 of FIG. 1 was constructed from the prepulse open circuit voltage of Test Cell No. 1, curve 12 was constructed from the minima of the first pulse of each pulse train of this cell and curve 14 was constructed from the minima of the fourth pulse of each pulse train of this cell. Likewise, curve 20 of FIG. 2 was constructed from the prepulse open current voltage of Test Cell No. 2, curve 22 was constructed from the minima of the first pulse of each pulse train of this cell and curve 24 was constructed from the minima of the fourth pulse of each pulse train of this cell.

Figure 3:
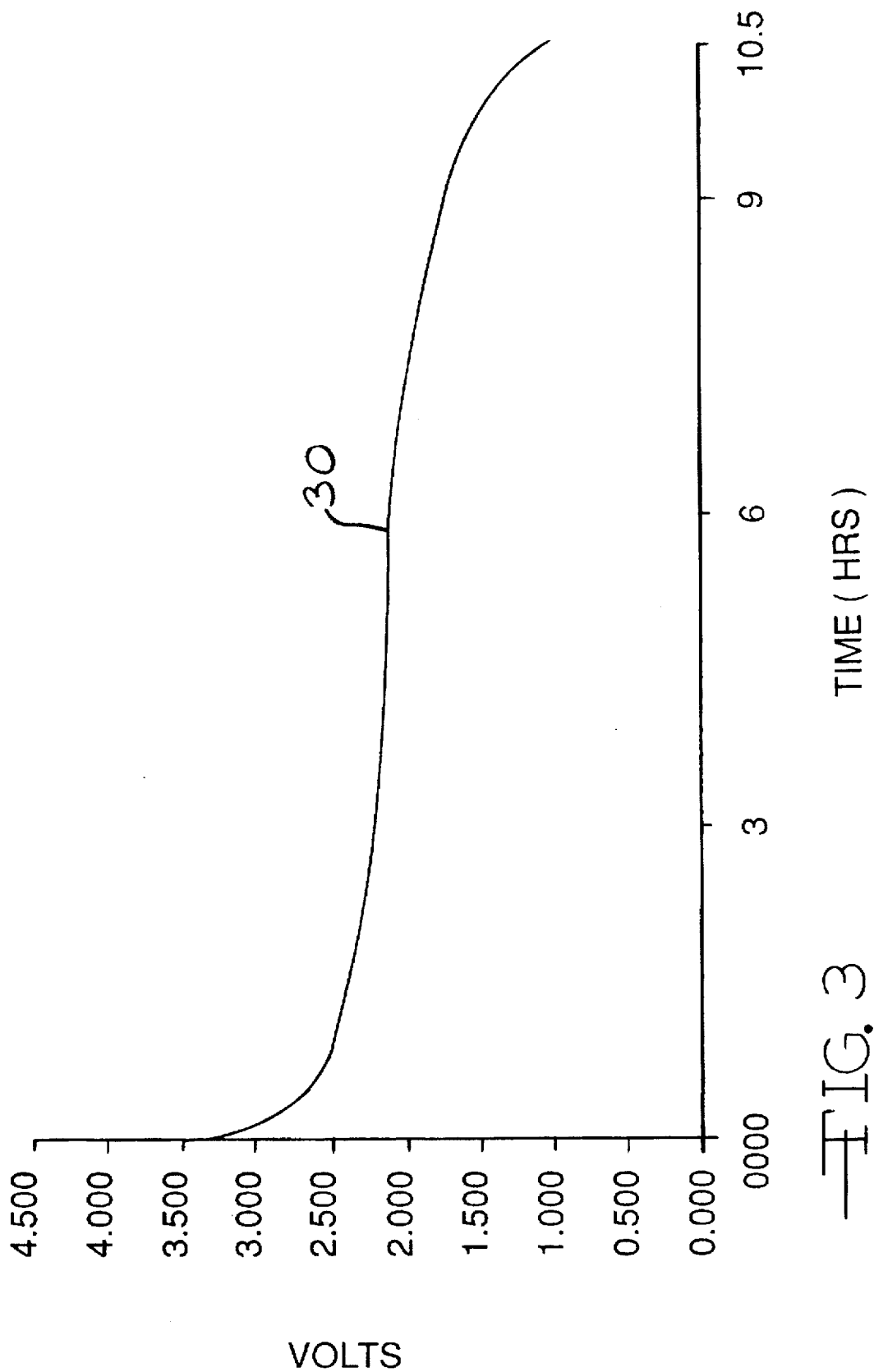
FIGS. 3 and 4 are graphs constructed from test cells incorporating a cathode formed having SVO plasma spray deposited onto a current collector substrate according to the present invention and discharged under a constant load.
Figure 4:
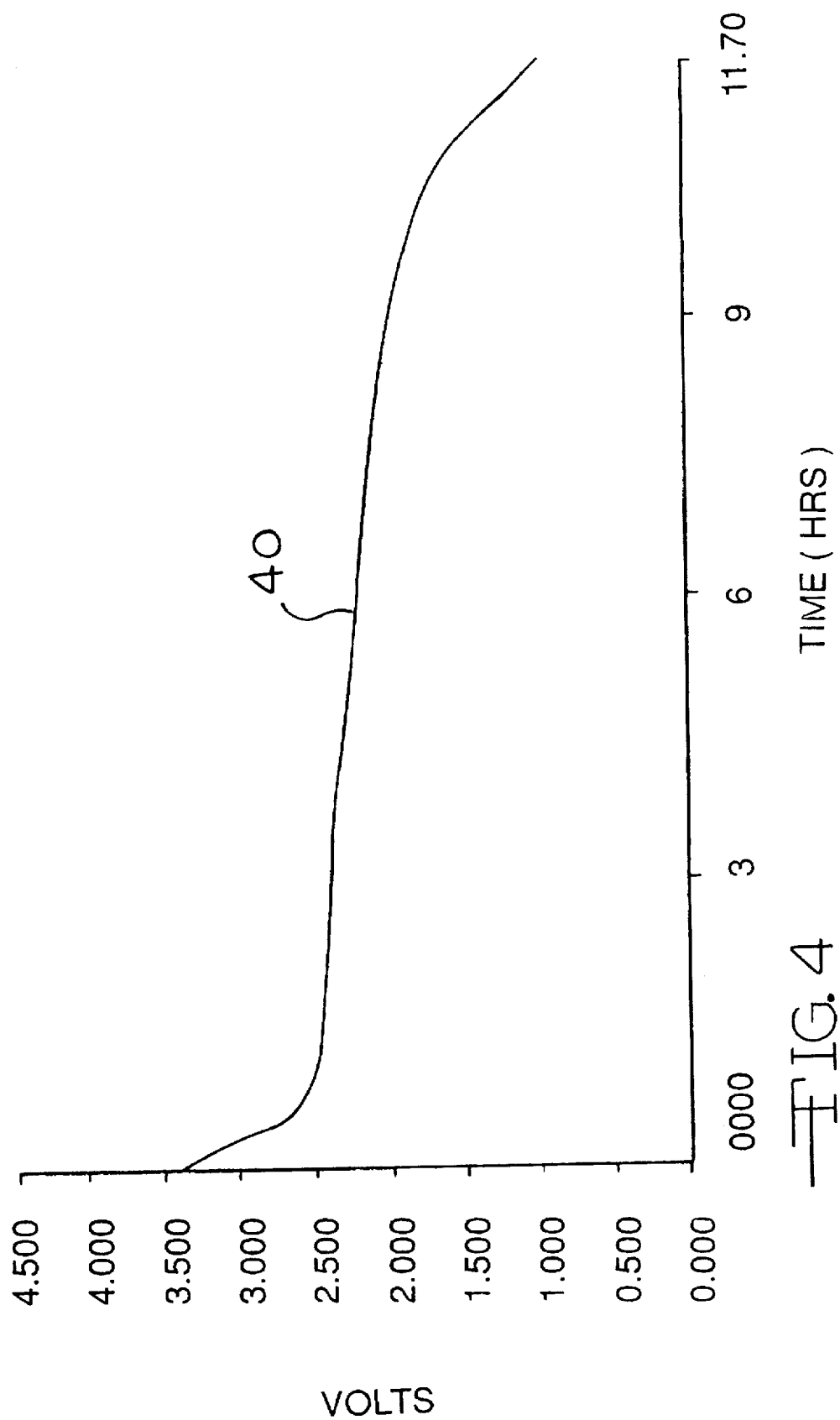

Test Cell Nos. 3 and 4 were discharged under a constant 60Ω load, and FIGS. 3 and 4 are voltage versus time graphs of the discharge under load of these test cells. Particularly, curve 30 in FIG. 3 was constructed from the discharge of Test Cell No. 3 under a 60Ω load and curve 40 in FIG. 4 was constructed from the discharge of Test Cell No. 4 under a similar load.

Figure 5:
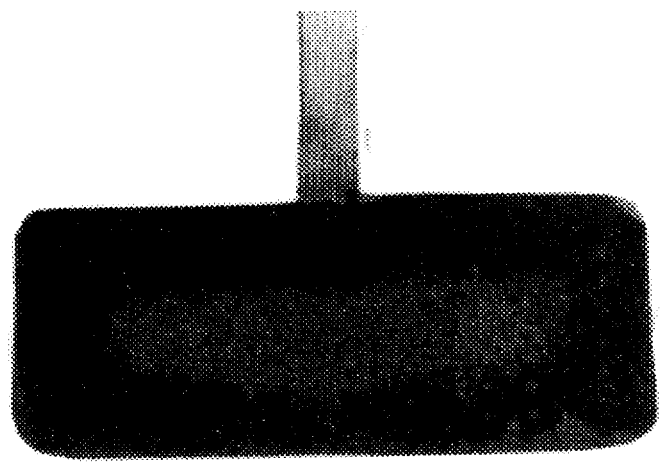
FIGS. 5 to 12 are photographs showing substrates having SVO plasma spray deposited thereon and used to fabricate the test cells discharged to construct FIGS. 1 to 4.
Figure 6:
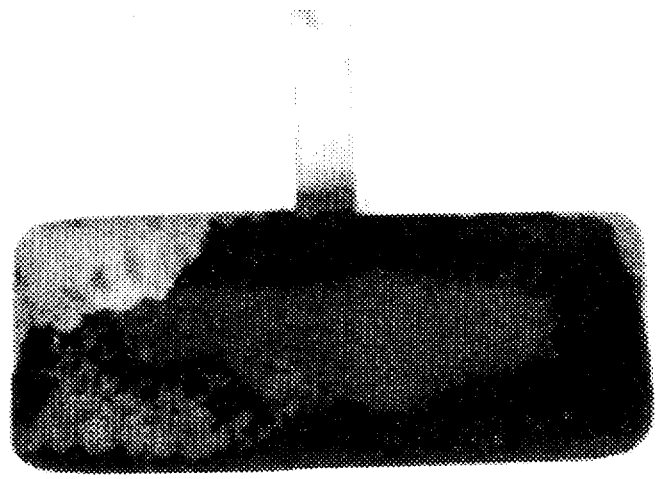
Figure 7:
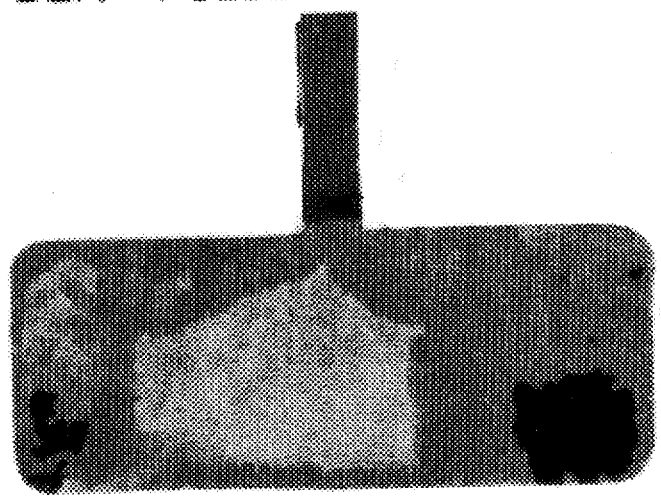
Figure 8:
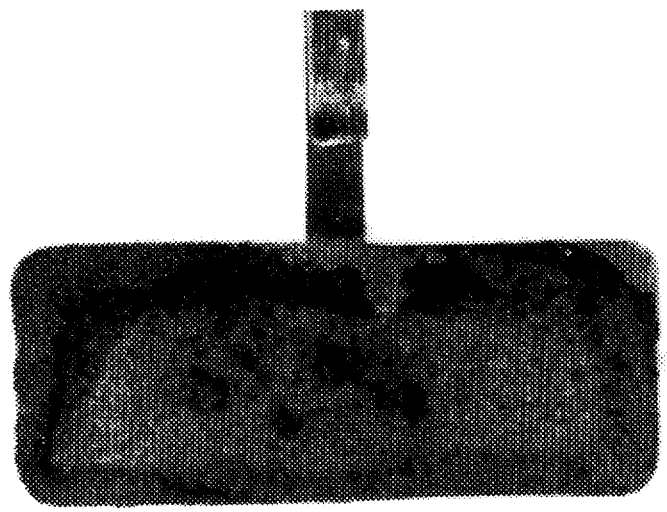
Figure 9:
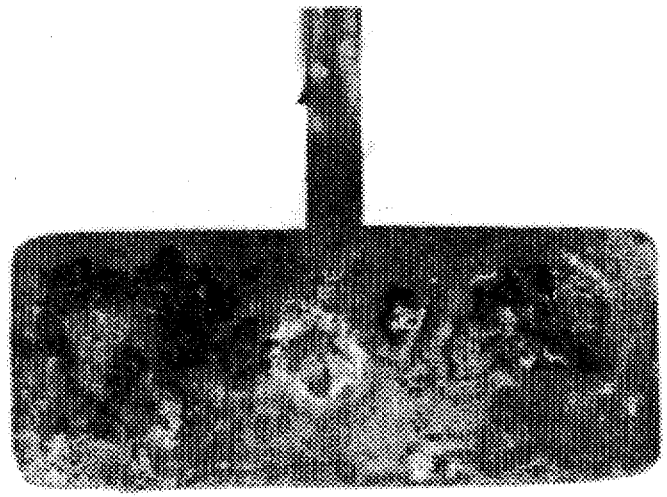
Figure 10:
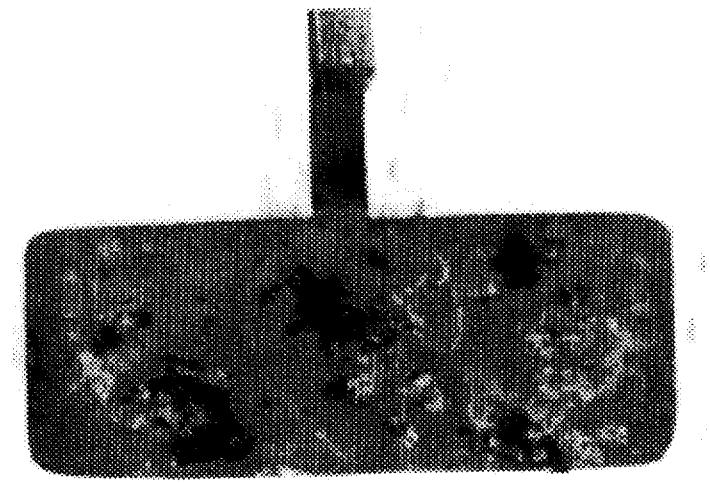
Figure 11:
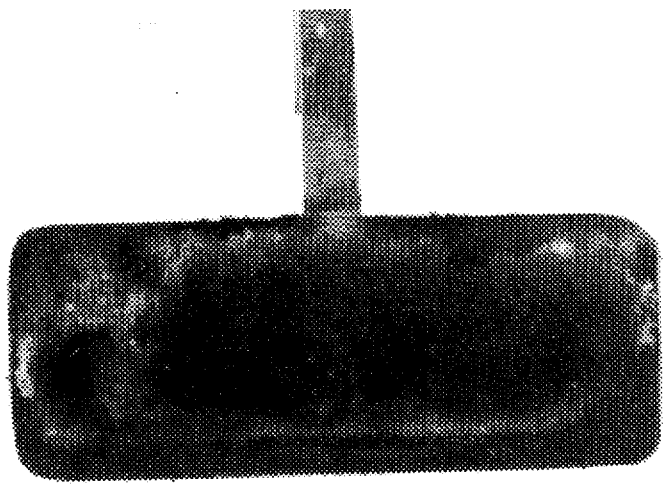
Figure 12:
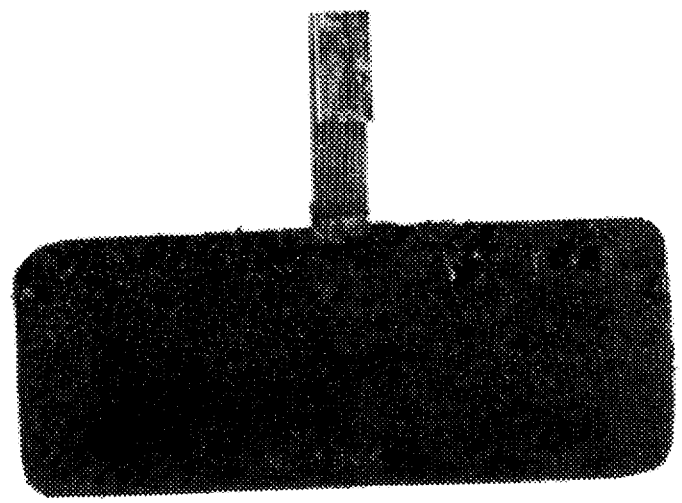

Following the completion of discharge, Cell Nos. 1 to 4 were subjected to destructive analysis, and the results for the various cathodes manufactured having a coating of silver vanadium oxide spray deposited thereon according to the present invention are as follows:

| Cathode No. 1 | Most of the cathode material (SVO) stayed on the substrate. The material that stayed on the substrate was held on loosely. The SVO can be easily scraped off of side two (2) of the substrate. Photographs of both sides of the substrate are shown in FIGS. 5 and 6. |
| --- | --- |
| Cathode No. 2 | Most of the SVO material fell off of this substrate. More of the SVO remained on side two than remained on side one. Photographs of both sides of this substrate are found in FIGS. 7 and 8. |
| Cathode No. 3 | Most of the SVO material fell off of both sides of this substrate. Photographs of both sides of this substrate are shown in FIGS. 9 and 10. |
| Cathode No. 4 | Most of the SVO fell off side one of this substrate. Side two of this substrate had a dark, almost burned appearance. This was noticed even before testing. Photographs of this substrate are found in FIGS. 11 and 12. |

The remaining SVO was removed from cathode substrate Nos. 2 and 3 during destructive analysis. With the SVO removed, the stainless steel leads were then removed as well. The initial weight of the bare substrates was taken and then compared to the previously recorded thermally sprayed substrate weights. The results are listed in Table 3.

TABLE 3

| Cathode No. | Weight of Bare Substrate (g) | Weight of Thermally Sprayed Substrate (g) |
| --- | --- | --- |
| 2 | 0.327 | 0.486 |
| 3 | 0.329 | 0.487 |

The difference between the weights recorded for cathode No. 2 is 0.159 g and for cathode No. 3 is 0.158 g. This means that there was approximately 0.159 g of SVO thermally sprayed on cathode substrate No. 2 and approximately 0.158 g of SVO thermally sprayed on cathode substrate No. 3.

Thus, it is apparent to those skilled in the art having read the foregoing description in conjunction with the appended Figures that thermal spraying an electrode active material represents a viable and alternate method of producing an electrode dischargeable in an electrochemical cell.

It is intended that the foregoing description and examples only be illustrative of the present invention and that the present invention is limited only by the hereinafter appended claims.

What is claimed is:

1. An electrochemical cell having a solid cathode, an anode which is electrochemically oxidizable to form metal ions in the cell upon discharge to generate electron flow in an external electrical circuit connected to the cell and an ionically conductive electrolyte activating and operatively associated the anode with the cathode, the cathode comprising:

a) a substrate; and
    b) a cathode active material provided as a thermal spray deposited layer coated on the substrate to a thickness of about 0.001 inches to about 0.4 inches.

2. The electrochemical cell of claim 1 wherein the substrate is flexible.

3. The electrochemical cell of claim 1 wherein the substrate comprises titanium or aluminum or mixtures thereof.

4. The electrochemical cell of claim 1 wherein the cathode active material is characterized as having been coated onto the substrate as an electric arc spray deposited layer.

5. The electrochemical cell of claim 1 wherein the cathode active material is characterized as having been coated onto the substrate as a detonation spray deposited layer.

6. The electrochemical cell of claim 1 wherein the cathode active material is selected from the group consisting of a metal, a metal oxide, a mixed metal oxide, a metal sulfide and a carbonaceous material and mixtures thereof.

7. The electrochemical cell of claim 1 wherein the cathode active material is selected from the group consisting of silver vanadium oxide, copper silver vanadium oxide, manganese dioxide, titanium disulfide, copper oxide, chromium oxide, copper sulfide, iron sulfide, iron disulfide, cobalt oxide, nickel oxide, carbon and fluorinated carbon, and mixtures thereof.

8. The electrochemical cell of claim 1 wherein the anode comprises a Group IA metal.

9. The electrochemical cell of claim 8 wherein the anode comprises lithium.

10. The electrochemical cell of claim 1 wherein the anode comprises an alkali metal and the electrolyte comprises an inorganic salt having the general formula $MM'F_6$ dissolved in a nonaqueous solvent, wherein M is an alkali metal similar to the alkali metal comprising the anode and M' is an element selected from the group consisting of phosphorous, arsenic and antimony.

11. The electrochemical cell of claim 1 wherein the electrolyte comprises an alkali metal salt of hexafluoroarsenate or hexafluorophosphate dissolved in a nonaqueous solvent.

12. The electrochemical cell of claim 11 wherein the nonaqueous solvent is selected from the group consisting of an inorganic solvent and an organic solvent.

13. The electrochemical cell of claim 12 wherein the nonaqueous solvent is a mixture of dimethoxyethane and propylene carbonate.

14. The electrochemical cell of claim 13 wherein the dimethoxyethane and propylene carbonate are present in a ratio of about 1:1, by volume.

15. A cathode means of an electrochemical cell, which comprises:
   a) a substrate of electrically conductive material; and
   b) a layer of cathode active material supported on the substrate wherein the layer of cathode active material is characterized as having been deposited onto the substrate by a thermal spray coating process to a thickness of about 0.001 inches to about 0.4 inches.

16. The cathode means of claim 15 wherein the substrate is flexible.

17. The cathode means of claim 15 wherein the substrate comprises titanium or aluminum or mixtures thereof.

18. The cathode means of claim 15 wherein the cathode active material is selected from the group consisting of a metal, a metal oxide, a mixed metal oxide, a metal sulfide and a carbonaceous material and mixtures thereof.

19. The cathode means of claims 15 wherein the cathode active material is selected from the group consisting of silver vanadium oxide, copper silver vanadium oxide, manganese dioxide, titanium disulfide, copper oxide, chromium oxide, copper sulfide, iron sulfide, iron disulfide, cobalt oxide, nickel oxide, carbon and fluorinated carbon, and mixtures thereof.

20. The cathode means of claim 15 wherein the substrate is perforated.

21. A method of manufacturing a cathode means of an electrochemical cell, comprising the steps of:
   a) providing a substrate; and
   b) thermal spraying a cathode active material onto the substrate to provide the cathode means comprising a coating of the cathode active material thermal spray deposited on the substrate to a thickness of about 0.001 inches to about 0.4 inches.

22. The method of claim 21 including spraying the cathode active material using a high velocity oxygen fuel spray coating process.

23. The method of claim 21 including spraying the cathode active material using an atmosphere plasma spray coating process.

24. The method of claim 21 including spraying the cathode active material using a wire or powder flame spray coating process.

25. The method of claim 21 including spraying the cathode active material using an electric arc spray coating process.

26. The method of claim 21 including spraying the cathode active material using a detonation spray coating process.

27. The method of claim 21 including selecting the cathode active material from the group consisting of a metal, a metal oxide, a mixed metal oxide, a metal sulfide and a carbonaceous material and mixtures thereof.

28. The method of claim 21 including selecting the cathode active material from the group consisting of silver vanadium oxide, copper silver vanadium oxide, manganese dioxide, titanium disulfide, cooper oxide, chromium oxide, copper sulfide, iron sulfide, iron disulfide, cobalt oxide, nickel oxide, carbon and fluorinated carbon, and mixtures thereof.

29. The method of claim 21 including roughening the substrate surface prior to thermal spraying the cathode active material thereon.

30. The method of claim 21 including providing the substrate as a flexible member.

31. The method of claim 21 including perforating the substrate prior to thermal spraying the cathode active material thereon.

32. The method of claim 31 including locking the cathode active material onto the substrate through the perforations by thermal spraying the cathode active material onto both sides of the substrate.

33. The method of claim 31 including providing the substrate comprising titanium or aluminum or mixtures thereof.

34. A method of manufacturing an electrochemical cells comprising the steps of:
   a) providing a casing of an electrically conductive material;
   b) providing an anode means;
   c) providing a cathode current collector;
   d) thermal spraying a coating of cathode active material onto the cathode current collector to provide a cathode means, wherein the coating of cathode active material has a thickness of about 0.001 inches to about 0.4 inches;
   e) disposing the cathode means and the anode means inside the casing; and
   f) activating and operatively associating the anode means with the cathode means by providing an ionically conductive electrolyte in the casing.

35. The method of claim 34 including spraying the cathode active material using a high velocity oxygen fuel spray coating process.

36. The method of claim 34 including spraying the cathode active material using an atmosphere plasma spray coating process.

37. The method of claim 34 including selecting the cathode active material from the group consisting of a metal, a metal oxide, a mixed metal oxide, a metal sulfide and a carbonaceous material and mixtures thereof.

38. The method of claim 34 including providing the substrate as a flexible member.

39. The method of claim 34 including roughening the substrate surface prior to thermal spraying the cathode active material thereon.

40. The method of claim 34 including perforating the substrate prior to thermal spraying the cathode active material thereon.

41. The method of claim 40 including locking the cathode active material onto the substrate through the perforations by thermal spraying the cathode active material onto both sides of the substrate.

42. The method of claim 34 including providing the substrate comprising titanium or aluminum or mixtures thereof.

43. The method of claim 34 including providing the anode comprising a Group IA metal.

44. The method of claim 34 including providing the anode comprising lithium.

45. The method of claim 34 including activating the electrochemical cell with the electrolyte comprising at least one ion-forming alkali metal salt of hexafluoroarsenate or hexafluorophosphate dissolved in a nonaqueous solvent.

46. The method of claim 45 including dissolving the ion-forming alkali metal salt in the nonaqueous solvent selected from the group consisting of an inorganic solvent and an organic solvent.

47. The method of claim 46 including selecting the organic solvent from the group consisting of tetrahydrofuran, propylene carbonate, methyl acetate, acetonitrile, dimethyl sulfoxide, dimethyl formamide, dimethyl acetamide, ethylene carbonate, diglyme, triglyme, tetraglyme, 1,2-dimethoxyethane and mixtures thereof.

48. The method of claim 34 including providing the anode comprising an alkali metal and activating the cell with the electrolyte comprising an inorganic salt having the general formula $MM'F_6$ dissolved in a nonaqueous solvent, wherein M is an alkali metal similar to the alkali metal comprising the anode and M' is an element selected from the group consisting of phosphorous, arsenic and antimony.

49. An electrochemical cell having a cathode comprising silver vanadium oxide, a lithium anode which is electrochemically oxidizable to form metal ions in the cell upon discharge to generate electron flow in an external electrical circuit connected to the cell and, an ionically conductive electrolyte comprising lithium hexafluorophosphate dissolved in an organic solvent, the electrolyte activating and operatively associating the anode and the cathode, the cathode comprising:

a) a substrate comprising titanium; and
   b) the silver vanadium oxide provided as a thermal spray deposited layer coated on the substrate.

50. A method of manufacturing an electrochemical cell, comprising the steps of:

a) providing a casing of an electrically conductive material;
   b) providing an anode means;
   c) providing a cathode current collector;
   d) spraying a coating of cathode active material onto the cathode current collector using a wire or powder flame spray coating process to provide a cathode means;
   e) disposing the cathode means and the anode means inside the casing; and
   f) activating and operatively associating the anode means with the cathode means by providing an ionically conductive electrolyte in the casing.

51. A method of manufacturing an electrochemical cell, comprising the steps of:

a) providing a casing of an electrically conductive material;
   b) providing an anode means;
   c) providing a cathode current collector;
   d) thermal spraying a coating of cathode active material onto the cathode current collector using an electric arc spray coating process to provide a cathode means;
   e) disposing the cathode means and the anode means inside the casing; and
   f) activating and operatively associating the anode means with the cathode means by providing an ionically conductive electrolyte in the casing.

52. A method of manufacturing an electrochemical cell, comprising the steps of:

a) providing a casing of an electrically conductive material;
   b) providing an anode means;
   c) providing a cathode current collector;
   d) thermal spraying a coating of cathode active material onto the cathode current collector using a detonation spray coating process to provide a cathode means;
   e) disposing the cathode means and the anode means inside the casing; and
   f) activating and operatively associating the anode means with the cathode means by providing an ionically conductive electrolyte in the casing.

53. A method of manufacturing an electrochemical cell, comprising the steps of:

a) providing a casing of an electrically conductive material;
   b) providing a lithium anode means;
   c) providing a cathode current collector of titanium;
   d) thermal spraying a coating of silver vanadium oxide onto the cathode current collector to provide a cathode means;
   e) disposing the cathode means and the anode means inside the casing; and
   f) activating and operatively associating the anode means with the cathode means by filling an ionically conductive electrolyte comprising lithium hexafluorophosphate dissolved in an organic solvent in the casing.

54. An electrochemical cell having a solid cathode, an anode which is electrochemically oxidizable to form metal ions in the cell upon discharge to generate electron flow in an external electrical circuit connected to the cell and an ionically conductive electrolyte activating and operatively associating the anode with the cathode, the cathode comprising:

a) a substrate; and
   b) a cathode active material provided as a thermal spray deposited layer coated on the substrate to a thickness of about 0.001 inches to about 0.4 inches, wherein the cathode active material is characterized as having been deposited onto the substrate as a high velocity oxygen fuel deposited layer.

55. An electrochemical cell having a solid cathode, an anode which is electrochemically oxidizable to form metal ions in the cell upon discharge to generate electron flow in an external electrical circuit connected to the cell and an ionically conductive electrolyte activating and operatively associating the anode with the cathode, the cathode comprising:

a) a substrate; and
   b) a cathode active material provided as a thermal spray deposited layer coated on the substrate to a thickness of about 0.001 inches to about 0.4 inches, wherein the cathode active material is characterized as having been deposited onto the substrate as a plasma spray deposited layer.

56. An electrochemical cell having a solid cathode, an anode which is electrochemically oxidizable to form metal ions in the cell upon discharge to generate electron flow in an external electrical circuit connected to the cell and an ionically conductive electrolyte activating and operatively associating the anode with the cathode, the cathode comprising:

a) a substrate; and
   b) a cathode active material provided as a thermal spray deposited layer coated on the substrate to a thickness of about 0.001 inches to about 0.4 inches, wherein the cathode active material is characterized as having been deposited onto the substrate as a wire or powder flame spray deposited layer.

57. An electrochemical cell having a solid cathode, an anode which is electrochemically oxidizable to form metal ions in the cell upon discharge to generate electron flow in an external electrical circuit connected to the cell and an ionically conductive electrolyte activating and operatively associating the anode with the cathode, the cathode comprising:

a) a substrate; and b) a cathode active material provided as a thermal spray deposited layer coated on the substrate to a thickness of about 0.001 inches to about 0.4 inches, wherein the cathode active material is characterized as having been deposited onto the substrate as an electric arc spray deposited layer.

58. An electrochemical cell having a solid cathode, an anode which is electrochemically oxidizable to form metal ions in the cell upon discharge to generate electron flow in an external electrical circuit connected to the cell and an ionically conductive electrolyte activating and operatively associating the anode with the cathode, the cathode comprising:

a) a substrate; and b) a cathode active material provided as a thermal spray deposited layer coated on the substrate to a thickness of about 0.001 inches to about 0.4 inches, wherein the cathode active material is characterized as having been deposited onto the substrate as a detonation spray deposited layer.

59. An electrochemical cell having a solid cathode, an anode which is electrochemically oxidizable to form metal ions in the cell upon discharge to generate electron flow in an external electrical circuit connected to the cell and an ionically conductive electrolyte activating and operatively associating the anode with the cathode, the cathode comprising:

a) a substrate characterized as having been cleaned and provided with a roughened surface texture; and b) a cathode active material provided as a thermal spray deposited layer coated on the substrate to a thickness of about 0.001 inches to about 0.4 inches.

60. An electrochemical cell having a solid cathode, an anode which is electrochemically oxidizable to form metal ions in the cell upon discharge to generate electron flow in an external electrical circuit connected to the cell and an ionically conductive electrolyte activating and operatively associating the anode with the cathode, the cathode comprising:

a) a perforated substrate; and b) a cathode active material provided as a thermal spray deposited layer coated on the substrate to a thickness of about 0.001 inches to about 0.4 inches.

61. The electrochemical cell of claim 60 wherein the perforated substrate supports cathode active material thermal spray deposited onto both of its sides to lock the cathode active material onto the substrate through the perforations.

62. A cathode means of an electrochemical cell, which comprises:

a) a substrate of electrically conductive material; and b) a layer of cathode active material deposited onto the substrate by a thermal spray coating process to a thickness of about 0.001 inches to about 0.4 inches, wherein the cathode active material is characterized as having been deposited onto the substrate as a high velocity oxygen fuel deposited layer.

63. A cathode means of an electrochemical cell, which comprises:

a) a substrate of electrically conductive material; and b) a layer of cathode active material deposited onto the substrate by a thermal spray coating process to a thickness of about 0.001 inches to about 0.4 inches, wherein the cathode active material is characterized as having been deposited onto the substrate as an plasma spray deposited layer.

64. A cathode means of an electrochemical cell, which comprises:

a) a substrate of electrically conductive material; and b) a layer of cathode active material deposited onto the substrate by a thermal spray coating process to a thickness of about 0.001 inches to about 0.4 inches, wherein the cathode active material is characterized as having been deposited onto the substrate as a wire or powder flame spray deposited layer.

65. A cathode means of an electrochemical cell, which comprises:

a) a substrate of electrically conductive material; and b) a layer of cathode active material deposited onto the substrate by a thermal spray coating process to a thickness of about 0.001 inches to about 0.4 inches, wherein the cathode active material is characterized as having been coated on to the substrate as an electric arc spray deposited layer.

66. A cathode means of an electrochemical cell, which comprises:

a) a substrate of electrically conductive material; and b) a layer of cathode active material deposited onto the substrate by a thermal spray coating process to a thickness of about 0.001 inches to about 0.4 inches, wherein the cathode active material is characterized as having been coated onto the substrate as a detonation spray deposited layer.

67. A cathode means of an electrochemical cell, which comprises:

a) a substrate of electrically conductive material, wherein the substrate is characterized as having been cleaned and provided with a roughened surface texture; and b) a layer of cathode active material supported on the substrate, wherein the layer of cathode active material is characterized as having been deposited onto the substrate by a thermal spray coating process to a thickness of about 0.001 inches to about 0.4 inches.

68. A cathode means of an electrochemical cell, which comprises:

a) a perforated substrate of electrically conductive material; and b) a layer of cathode active material supported on the substrate, wherein the layer of cathode active material is characterized as having been deposited onto the substrate by a thermal spray coating process to a thickness of about 0.001 inches to about 0.4 inches.

69. The cathode means of claim 68 wherein the perforated substrate supports cathode active material thermal spray deposited onto both of its sides to lock the cathode active material onto the substrate through the perforations.

* * * * *